(12) United States Patent
Natarajan

(10) Patent No.: US 7,333,799 B2
(45) Date of Patent: Feb. 19, 2008

(54) WAP XML EXTENSION TO DEFINE VPN CONNECTIONS

(75) Inventor: Sureshkumar Natarajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 222 days.

(21) Appl. No.: 10/703,365

(22) Filed: Nov. 7, 2003

(65) Prior Publication Data

US 2005/0101305 A1    May 12, 2005

Related U.S. Application Data

(60) Provisional application No. 60/498,864, filed on Aug. 29, 2003.

(51) Int. Cl.
   *H04M 1/66* (2006.01)
(52) U.S. Cl. ........... 455/411; 455/414.1; 455/556.1; 455/558; 713/151
(58) Field of Classification Search ........... 370/349, 370/352, 401, 389–395.1; 455/414.1, 556.1, 455/557, 558, 556.2, 552; 707/200; 709/223–227, 709/230–233, 243–249, 200; 713/201
See application file for complete search history.

(56) References Cited

U.S. PATENT DOCUMENTS

| | | | | |
|---|---|---|---|---|
| 6,640,097 | B2 * | 10/2003 | Corrigan et al. | 455/414.1 |
| 6,788,681 | B1 * | 9/2004 | Hurren et al. | 370/389 |
| 2002/0059614 | A1 * | 5/2002 | Lipsanen et al. | 725/75 |
| 2002/0101848 | A1 * | 8/2002 | Lee et al. | 370/349 |
| 2003/0051170 | A1 * | 3/2003 | Spearman | 713/201 |
| 2003/0084165 | A1 * | 5/2003 | Kjellberg et al. | 709/227 |
| 2003/0172090 | A1 * | 9/2003 | Asunmaa et al. | 707/200 |
| 2004/0107366 | A1 * | 6/2004 | Balfanz et al. | 713/201 |
| 2006/0068845 | A1 * | 3/2006 | Muller et al. | 455/558 |

OTHER PUBLICATIONS

Yih-Farn Chen et al.; "iMobile EE—An Enterprise Mobile Service Platform"; Wireless Networks 9, 2003, pp. 283-297.
Vipul Gupta et al.; "Secure and Mobile Networking"; Mobile Networks and Applications 3 (1998); pp. 381-390.
Francisco Barcelo et al.; "Design and Modeling of Internode: A Mobile Provider Provisioned VPN"; Mobile Networks and Applications 8, 2003; pp. 51-60.
Joshua Piven; *Time to Say "Bye-Bye" to Wifi?*; Jan. 2002, vol. XXII No. 1, p. 1; p. 42-43; Computer Technology Review.
A. Calvagna, G. Morabito, A. La Corte; *WiFi Bridge: Wireless Mobility Framework Supporting Session Continuity*; 2003 IEEE; pp. 79-86.
A. Calvagna, G. Morabito, A. Pappalardo; *WiFi Mobility Framework Supporting GPRS Roaming: Design and Implementation*; 2003 IEEE; pp. 116-120.

(Continued)

*Primary Examiner*—Temica Beamer
(74) *Attorney, Agent, or Firm*—Merchant & Gould P.C.

(57) ABSTRACT

Described is a method and system for automatically provisioning a mobile device with VPN (Virtual Private Network) information so that users can automatically connect to their corporate networks using their devices. An XML based mechanism uses the WAP (wireless application protocol) XML structure and extends it to define VPN connections and provision them onto the devices automatically either over-the-air or by an IT application provided by the corporation.

20 Claims, 4 Drawing Sheets

OTHER PUBLICATIONS

J. B. Miles; *Evolving Standards Expand Wireless Reach. (Buyers Guide)*; Government Computer News vol. 20 No. 2, Jan. 22, 2001.
Andrew Garcia; *Tightening WLAN Security*; eWeek Sep. 4, 2001.
Carmen Nobel; *Putting Focus on WLANs*; May 7, 2001.
Kevin Jonah; *Securing the Airways*; May 6, 2002; vol. 21 No. 10.

* cited by examiner

WAP XML EXTENSION TO DEFINE VPN CONNECTIONS

RELATED APPLICATIONS

This utility application claims the benefit under 35 United States Code § 119(e) of U.S. Provisional Patent Application No. 60/498,864 filed on Aug. 29, 2003.

BACKGROUND OF THE INVENTION

Today, there a variety of mobile devices that are designed to keep a user updated with current information. These include personal digital assistants, wireless phones, email devices, and the like. Mobile devices are now capable of connecting to the Internet thorough various means and thus exchange information over the Internet. But, in addition to the Internet, these mobile devices would also like to send and receive information on the user's corporate network. This may include emails, attachments to emails, web page content, and the like.

Many corporations provide access to their corporate network from the Internet through a VPN (Virtual Private Network). VPN connections are used to establish a secure tunnel from a public Internet connection into a private/corporate network. Most corporations enable such secure connections into their private networks from a public Internet connection. So a mobile device with a connection to the Internet can use a VPN connection to access the corporate network. It is often cumbersome, however, to connect to a user's corporate network through a VPN from a mobile device.

As most cellular networks typically provide ways for mobile devices to connect to the Internet either through slow circuit-switched RAS connections or high-speed GPRS/1xRTT data connections, what is needed is a way for a mobile device to be able to easily connect to their corporate network through the company's VPN.

SUMMARY OF THE INVENTION

The present invention is directed at automatically provisioning a mobile device with VPN information so that users can automatically connect to their corporate networks using their devices. An XML based mechanism uses the WAP (wireless application protocol) XML structure and extends it to define VPN connections and provision them onto the devices automatically either over-the-air or by an IT application provided by the corporation.

DETAILED DESCRIPTION OF THE PREFERRED EMBODIMENT

Briefly stated, the present invention is directed at automatically provisioning a mobile device with VPN (Virtual Private Network) information so that users can automatically connect to their corporate networks using their devices. An XML based mechanism uses the WAP (wireless application protocol) XML structure and extends it to define VPN connections and provision them onto the devices automatically either over-the-air or by an IT application provided by the corporation. These and other aspects of the invention will become apparent to those skilled in the art after reading the following detailed description.

Illustrative Operating Environment

Figure 1:
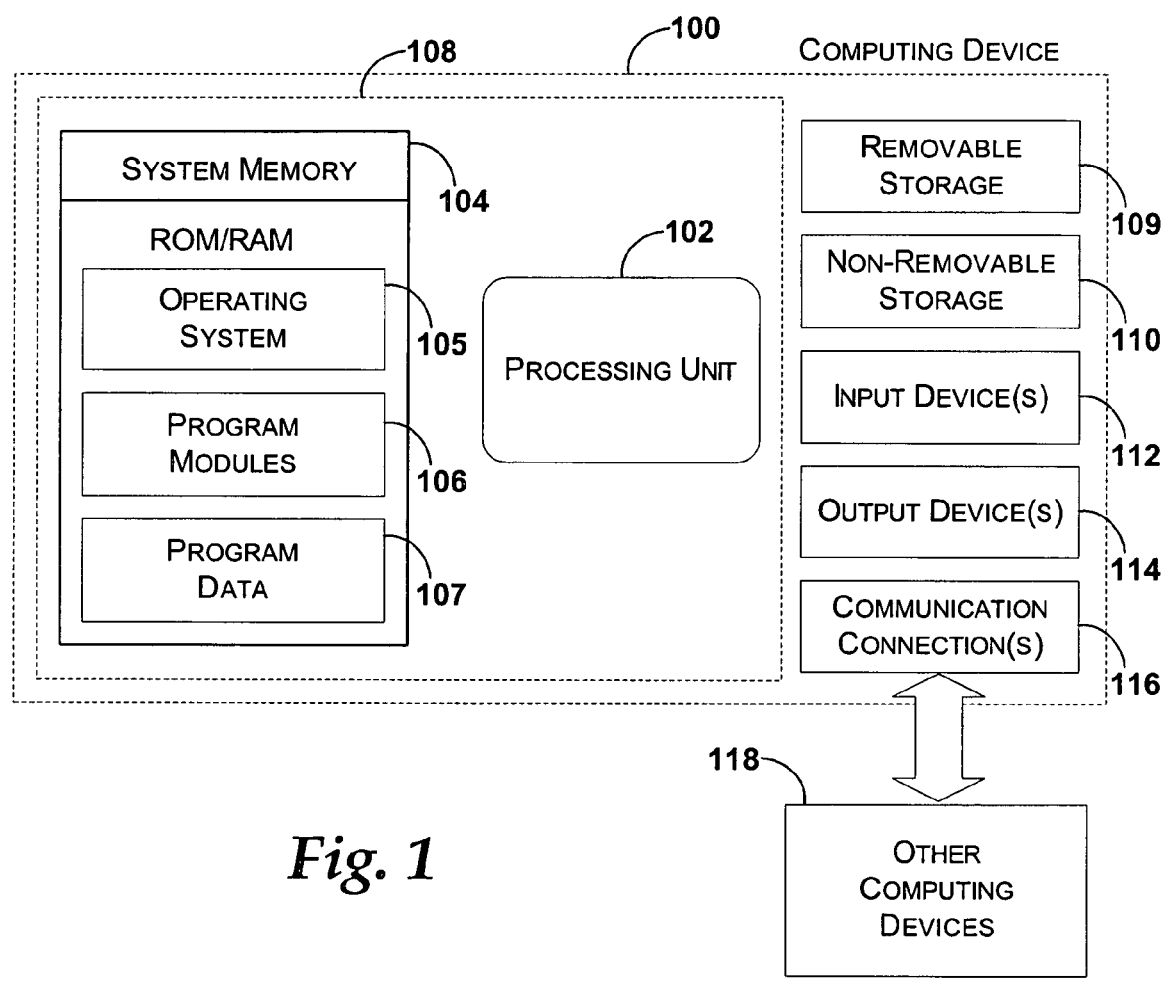
FIG. 1 illustrates an exemplary computing device.

With reference to FIG. 1, an exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
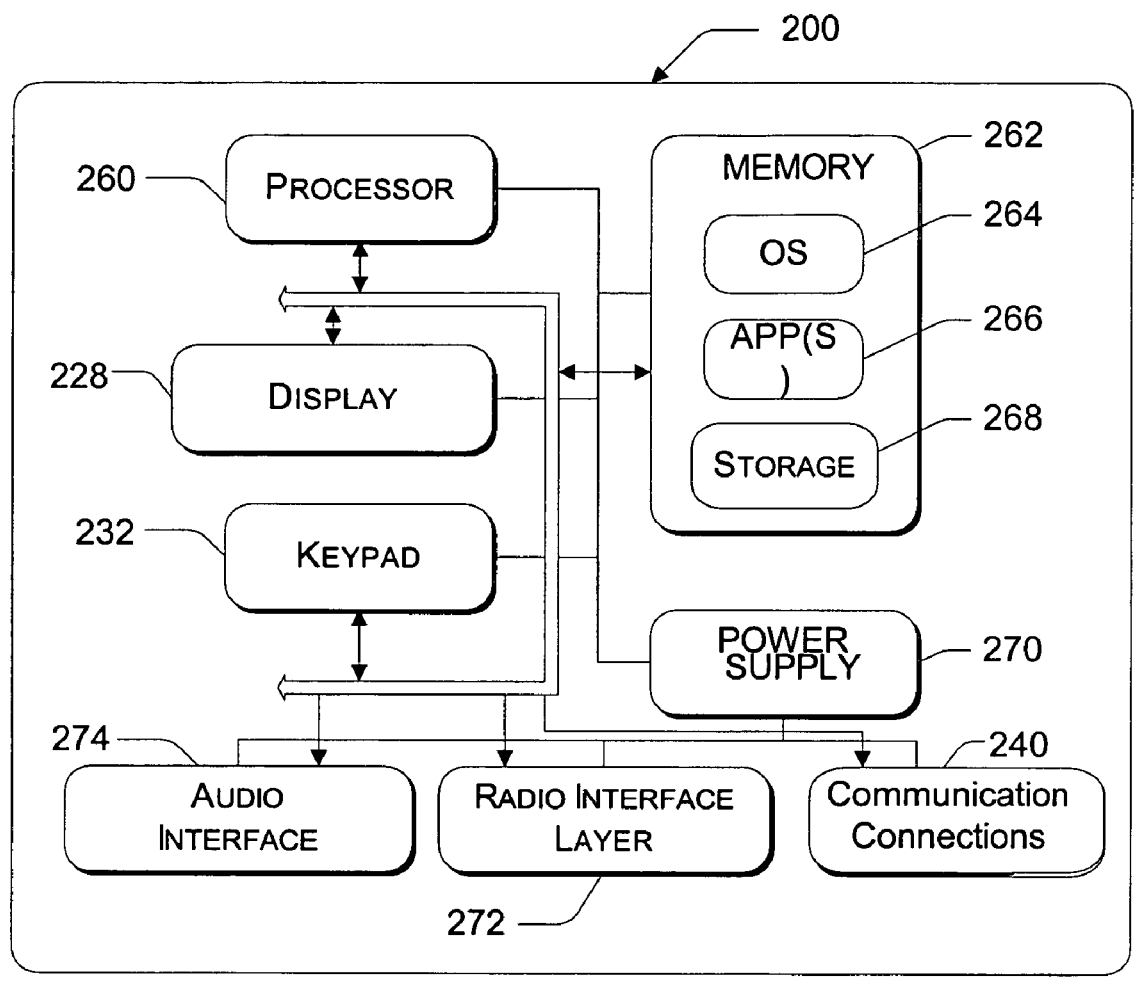
FIG. 2 illustrates an exemplary mobile device.

With reference to FIG. 2, one exemplary system for implementing the invention includes a mobile device, such as mobile device 200. The mobile device 200 has a processor 260, a memory 262, a display 228, and a keypad 232. The memory 262 generally includes both volatile memory (e.g., RAM) and non-volatile memory (e.g., ROM, Flash Memory, or the like). The mobile device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing program, and the like.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 may also include external notification mechanisms, such as an LED (not shown) and an audio interface 274. These devices may be directly coupled to the power supply 270 so that when activated, they remain on for a duration dictated by the notification mechanism even though the processor 260 and other components might shut down to conserve battery power. The audio interface 274 is used to provide audible signals to and receive audible signals from the user. For example, the audio interface 274 may be coupled to a speaker for providing audible output and to a microphone for receiving audible input, such as to facilitate a telephone conversation.

Mobile computing device 200 may also contain communication connections 240 that allow the device to communicate with other computing devices, such as over a wireless network. The mobile computing device 200 also includes a radio interface layer 272 that performs the function of transmitting and receiving radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 and communication connections 240 may be disseminated to application programs 266 via the operating system 264, and vice versa.

Illustrative VPN System

Figure 3:
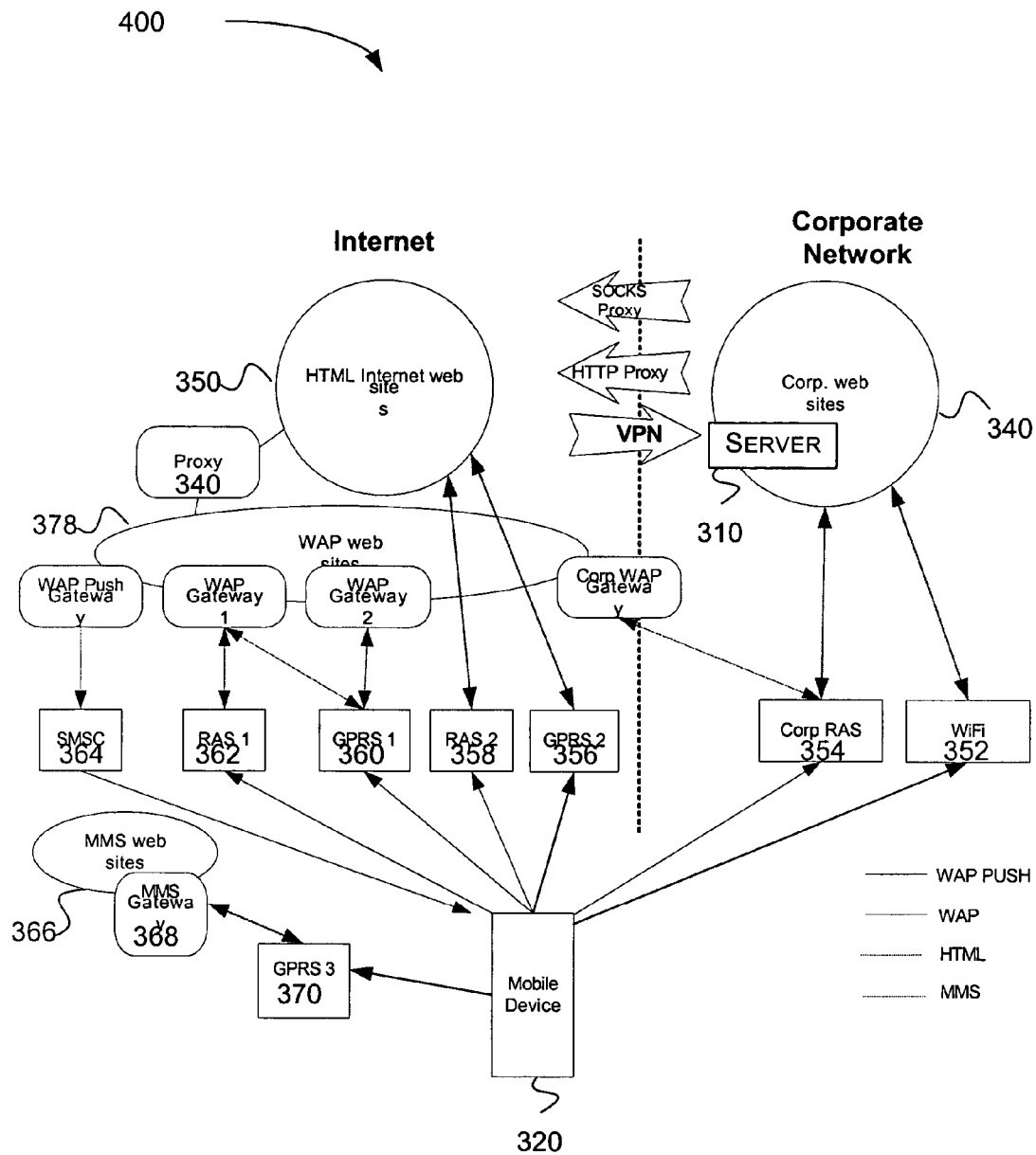
FIG. 3 is a functional block diagram of an exemplary VPN provisioning system.

FIG. 3 is a functional block diagram generally illustrating a VPN provisioning system 300, in accordance with aspects of the invention. Server 310 is a computing device such as the one described above in conjunction with FIG. 1, and the mobile device 320 is a mobile computing device such as the one described above in conjunction with FIG. 2.

In one embodiment of the present invention, server 310 is configured as a server on a corporate network creating a secure connection to corporate network 340. An example of a WAN is the Internet (350) connects millions of computers over a host of gateways, routers, switches, hubs, and the like. An example of a LAN is a network used to connect computers in a single office. A WAN may connect multiple LANs.

Several mobile devices may be associated with one user. For example, the user may have a personal digital assistant, a cellular phone, an email device, and the like. In one embodiment, server 310 maintains a VPN provisioning database with data on VPN connections.

A typical mobile device will have the ability to use multiple connection paths to connect to the Internet or the Corporate Network. A VPN connection enables one of the key connection paths for the device—from the Internet into the Corporate Network. An XML based mechanism is specified that uses the WAP XML structure and extends it to define such VPN connections and provision them onto the devices automatically either over-the-air or by an IT application provided by the corporation or any other means (e.g. through SIM card based provisioning, Bluetooth etc.)

As illustrated within FIG. 3, mobile device 320 is capable of connecting to the Internet 350, WAP web sites 378, MMS web sites 366, and to Corporate Network 340. Mobile device 320 connects to corporate web sites 340 using Corp RAS 354 and WiFi 352. Mobile device 320 connects to the Internet 350 through RAS2 358, GPRS 2 356, and through proxy 340. Mobile device 320 connects to WAP web sites 378 through GPRS 1 (360), RAS 1 (362) and SMSC 364. Mobile device 320 connects to MMS web sites 366 through GPRS 3 (370) via MMS gateway 368.

From the corporate network 340 to the WAP web sites there is a path from Corp RAS 354 to a Corp WAP Gateway and to the Internet through a SOCKS proxy and an HTTP proxy. From the Internet to the corporate network a VPN is used.

VPN (Virtual Private Network) connections are used to establish a secure tunnel from a public Internet (350) connection into a private/corporate network (340). Most corporations enable secure connections into their private networks from a public Internet connection and since cellular networks typically provide ways for mobile devices to connect to the Internet either through slow circuit-switched RAS connections or high-speed GPRS/1xRTT data connections, it is useful to provision the mobile devices (320) automatically with VPN information so that the users can automatically connect to their corporate networks using their devices.

Enabling such provisioning via XML provides operators and corporations a well-known and standardized mechanism to bootstrap the devices with the settings for VPN connections and also update them periodically. The standard WAP XML structure is extended to support VPN connection settings.

XML based provisioning is used as a means for configuring devices with VPN connections. VPN definitions are made a part of the WAP XML schema to enable provisioning of VPN connections, and a stand-alone characteristic (or extend already defined characteristics in WAP XML) is used to define VPN.

Using XML based provisioning of VPN connections enables operators or corporations to bootstrap the device with VPN connectivity in addition to regular data and proxy connections. In addition to providing a well-known standardized mechanism for provisioning the VPN settings, using XML also enables easy updates of these settings on a periodical basis. The XML information can be delivered through various means.

WAP XML already defines XML schema to provision cellular data connections (e.g. GSM-CSD, GSM-GPRS), proxy connections and access characteristics. Together, these enable the device to be provisioned with various connectivity settings and also the application-specific connection preferences. Making VPN definitions a part of WAP XML makes the WAP XML standard more complete and at the same time, by using the existing characteristic/parm structure defined by WAP to enable VPN provisioning makes it easier for devices to implement the additional XML required.

According to two embodiments of the invention, there are two ways of defining VPN inside WAP XML—either via a stand-alone characteristic or by extending already defined characteristics.

Using a stand-alone characteristic is the most straightforward way to make VPN definitions as part of WAP XML. A stand-alone characteristic named VPNDEF can be used to specify all the settings related to a VPN connection:

```
characteristic: VPNDEF *
{
    parm: VPNID              // Used to uniquely identify
                             // the VPN connection
    parm: NAME               // Name of the VPN connection
    parm: VPN-ADDRESS        // Address of the VPN server
    characteristic:          // Sub-characteristic to define
    VPNAUTHINFO *
                             // security credentials
    {
        parm: AUTHTYPE       // Authentication type - "PPTP"
                             // or "IPSEC"
        parm: AUTHIPSEC ?    // IPSec type - "Cert" or "PSK"
                             // (Pre-shared key). Valid only
                             // for AUTHTYPE="IPSEC".
        parm:                // IPSec Cert
        AUTHIPSEC_CERT ?
        parm:                // IPSec Pre-shared key
        AUTHIPSEC_PSK ?
        parm: AUTHNAME ?     // User name
        parm: AUTHSECRET ?   // Password
    }
    parm: TO-NAPID *         // NAPIDs that can use this VPN
                             // connection
}
```

The following example illustrates how the VPNDEF characteristic can be used to define the settings of a VPN connection:

```
<characteristic type="VPNDEF">
    <parm name="VPN-ID" value="VPN1" />
    <parm name="NAME" value="MYCOMPANY_VPN1" />
    <parm name="VPN-ADDRESS" value=
    "corp-vpn.mycompany.com" />
    <characteristic type="VPNAUTHINFO">
        <parm name="AUTHTYPE" value="IPSEC" />
        <parm name="AUTHIPSEC" value="CERT" />
        <parm name="AUTHNAME" value="mydomain\myuser"/>
        <parm name="AUTHSECRET" value="mypassword"/>
    </characteristic>
    <parm name="TO-NAPID" value="GPRS1" />
    <parm name="TO-NAPID" value="WiFi2" />
</characteristic>
```

Another option is to extend already-defined characteristics (such as either PXLOGICAL or NAPDEF) to support VPN definitions. According to this embodiment, a new "parms" definition is defined inside those characteristics to support VPN specific settings. Many of the settings defined inside PXLOGICAL or NAPDEF are not be applicable in case of VPN, so, the stand-alone characteristic approach outlined earlier is preferred.

Figure 4:
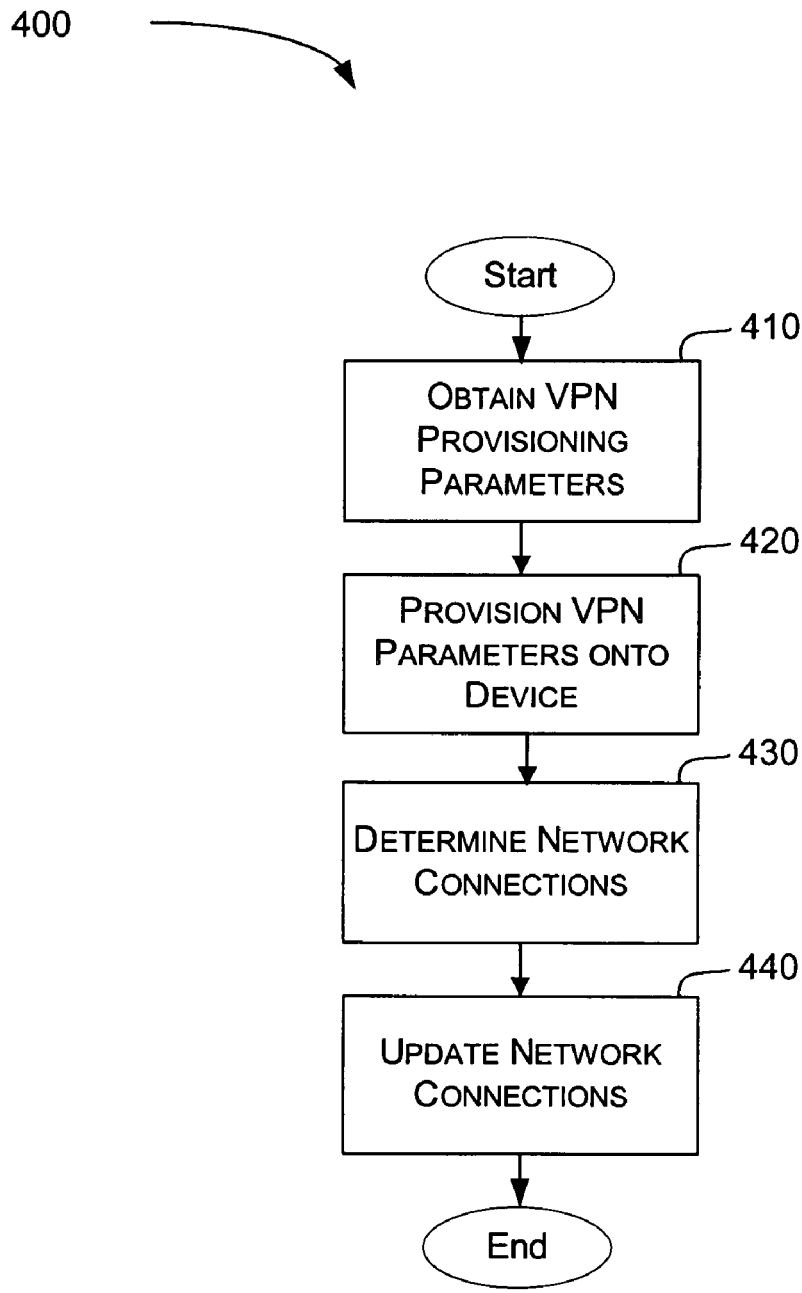
FIG. 4 illustrates a process for provisioning a device with VPN connections, in accordance with aspects of the invention.

FIG. 4 illustrates a process for provisioning a device with VPN connections, in accordance with aspects of the invention.

After a start block, the process flows to block 410 where VPN provisioning parameters are obtained. The parameters may be obtained in many different ways. For example, the parameters may be stored on a SIM card associated with the mobile device, or the parameters may be transferred to the device by a program. Moving to block 420, the parameters are incorporated onto the device automatically. In this way, the user does not have to manually set all of the parameters associated with the VPN connection. Flowing to block 430, the network connections that the device may used to connect to the VPN may be determined. This may be accomplished in many different ways. For example, the connections may be already known by the device, or as the device learns of new connections then these connections can be incorporated into the device. Moving to block 440, the network connections used to connect to the VPN may be updated based on the determined network connections. The process then moves to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for defining VPN connections for a mobile device, comprising:
   creating a VPN definition; wherein the VPN definition includes a unique identifier that uniquely identifies a VPN connection, a name of a VPN connection, an address of a VPN server; characteristics to define security credentials and network access points that can use the VPN connection;
   incorporating the VPN definition into a WAP schema; wherein the WAP schema is used to provision cellular data connections, proxy connections and access characteristics; and
   provisioning the mobile device with a VPN connection using the WAP schema that creates a secure tunnel from the mobile device to a network.

2. The method of claim 1, wherein the WAP schema further comprises using an XML schema.

3. The method of claim 1, wherein provisioning the mobile device with the VPN connection occurs automatically.

4. The method of claim 1, wherein provisioning the mobile device with the VPN connection further comprises loading a SIM card with the VPN connection.

5. The method of claim 2, wherein incorporating the VPN definition into the WAP schema further comprises extending a WAP XML structure to define the VPN connection.

6. The method of claim 5, wherein provisioning the mobile device further comprises using a wireless connection to automatically provision the mobile device.

7. The method of claim 6, wherein the provisioning the mobile device further comprises using an application to provision the mobile device.

8. The method of claim 2, wherein creating the VPN definition further comprises creating a stand-alone characteristic associated with the WAP XML schema.

9. The method of claim 2, wherein creating the VPN definition further comprises extending an existing characteristic associated with the WAP XML schema.

10. A system for provisioning VPN information associated with a mobile device, comprising:
 a server configured to maintain data relating to the VPN information, wherein the VPN information is incorporated into a WAP XML schema; wherein the VPN information includes a unique identifier that uniquely identifies a VPN connection, a name of the VPN connection, an address of a VPN server; characteristics to define security credentials and network access points that can use the VPN connection and wherein the WAP XML schema is used to provision cellular data connections, proxy connections and access characteristics; and
 a mobile device coupled to the server and configured to receive the VPN information enabling the mobile device to communicate with a network through a secure tunnel.

11. The system of claim 10, wherein the mobile device is bootstrapped with the VPN information.

12. The system of claim 11, wherein the mobile device further comprises a SIM card that is provisioned with the VPN information.

13. The system of claim 10, wherein the server is further configured to transfer the VPN information to the mobile device.

14. The system of claim 11, wherein the mobile device is further configured to receive updated VPN information based on determined network connections.

15. The system of claim 10, wherein the VPN information incorporated into the WAP XML schema further comprises extending a WAP XML structure to define the VPN information.

16. The method of claim 10, wherein the VPN information incorporated into the WAP XML schema further comprises creating a stand-alone characteristic associated with the WAP XML schema.

17. A computer-readable medium for automatically provisioning a mobile device with VPN information, comprising:
 creating a VPN definition that includes a unique identifier that uniquely identifies a VPN connection, a name of the VPN connection, an address of a VPN server; characteristics to define security credentials and network access points that can use the VPN connection;
 incorporating the VPN definition into a WAP XML schema; wherein the WAP XML schema is used to provision cellular data connections, proxy connections and access characteristics; and
 provisioning the mobile device with a VPN connection using the WAP XML schema that creates a secure tunnel from the mobile device to a network.

18. The computer-readable medium of claim 17, wherein provisioning the mobile device with the VPN connection further comprises loading a SIM card with the VPN connection.

19. The computer-readable medium of claim 17, wherein creating the VPN definition further comprises creating a stand-alone characteristic associated with the WAP XML schema.

20. The computer-readable medium of claim 17, wherein creating the VPN definition further comprises extending an existing characteristic associated with the WAP XML schema.

* * * * *